US012618684B2

(12) United States Patent
Katsurano et al.

(10) Patent No.: US 12,618,684 B2
(45) Date of Patent: May 5, 2026

(54) PROCESSING DEVICE

(71) Applicant: SUBARU CORPORATION, Tokyo (JP)

(72) Inventors: Takehiko Katsurano, Tokyo (JP); Yusuke Okubo, Tokyo (JP); Shinji Sawada, Tokyo (JP); Yoshiaki Maezawa, Tokyo (JP); Takahiro Ueki, Tokyo (JP); Takahito Fujino, Tokyo (JP); Ryuya Suzuki, Tokyo (JP); Norio Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 9 days.

(21) Appl. No.: 18/765,488

(22) Filed: Jul. 8, 2024

(65) Prior Publication Data

US 2024/0361138 A1 Oct. 31, 2024

Related U.S. Application Data

(63) Continuation of application No. PCT/JP2023/010406, filed on Mar. 16, 2023.

(51) Int. Cl.
*G01C 21/34* (2006.01)

(52) U.S. Cl.
CPC ..... *G01C 21/3469* (2013.01); *G01C 21/3492* (2013.01)

(58) Field of Classification Search
CPC . G01C 21/3469; G01C 21/3492; G01C 21/26
See application file for complete search history.

(56) References Cited

U.S. PATENT DOCUMENTS

| | | | | |
|---|---|---|---|---|
| 2007/0021909 A1* | 1/2007 | Matsuda | ........... | G01C 21/3469 |
| | | | | 701/532 |
| 2010/0145600 A1* | 6/2010 | Son | ........ | G08G 1/052 |
| | | | | 701/123 |
| 2012/0004838 A1* | 1/2012 | Lee | .......... | G01C 21/3469 |
| | | | | 701/123 |

(Continued)

FOREIGN PATENT DOCUMENTS

| | | | |
|---|---|---|---|
| JP | 2007-24833 A | | 2/2007 |
| JP | 2010164360 A | * | 7/2010 |
| JP | 2012-220415 A | | 11/2012 |

OTHER PUBLICATIONS

International Search Report dated May 23, 2023 from International Application No. PCT/JP2023/010406, 9 pages.

*Primary Examiner* — Khoi H Tran
*Assistant Examiner* — Tristan J Greiner
(74) *Attorney, Agent, or Firm* — Rimon P.C.

(57) ABSTRACT

A processing device includes one or more processors and one or more memories coupled to the one or more processors. The one or more processors are configured to perform a process including: acquiring pattern information, which is information indicating an operation pattern of at least one traffic light that is present on a traveling route of a vehicle; predicting, based on the pattern information, a number of stops, which is a number of times the vehicle is to stop at the at least one traffic light; and predicting, based on the number of stops, a total consumption amount of an energy source of the vehicle in a case where the vehicle travels on the traveling route.

4 Claims, 4 Drawing Sheets

(56) References Cited

U.S. PATENT DOCUMENTS

| | | | |
|---|---|---|---|
| 2016/0039420 A1* | 2/2016 | Tosaka | .............. B60W 50/0097 |
| | | | 701/99 |
| 2019/0178662 A1* | 6/2019 | Son | .................... G01C 21/3469 |

* cited by examiner

PROCESSING DEVICE

CROSS REFERENCES TO RELATED APPLICATIONS

This application is continuation of International Application No. PCT/JP2023/010406, filed on Mar. 16, 2023, the entire contents of which are hereby incorporated by reference.

BACKGROUND

Technical Field

The present disclosure relates to a processing device.

Related Art

While traveling, vehicles consume an energy source mounted thereon. For example, in an electric vehicle, electric power stored in a battery is used as the energy source. In order to assist driving of a driver who drives the vehicle, consumption of the energy source of the vehicle may be predicted. For example, Japanese Unexamined Patent Application Publication No. 2012-220415 discloses a technique for predicting a cruisable distance of the vehicle by predicting the consumption amount of the energy source of the vehicle.

SUMMARY

An aspect of the disclosure provides a processing device including one or more processors and one or more memories coupled to the one or more processors. The one or more processors are configured to perform a process including: acquiring pattern information, which is information indicating an operation pattern of at least one traffic light that is present on a traveling route of a vehicle; predicting, based on the pattern information, a number of stops, which is a number of times the vehicle is to stop at the at least one traffic light; and predicting, based on the number of stops, a total consumption amount of an energy source of the vehicle in a case where the vehicle travels on the traveling route.

DETAILED DESCRIPTION

Figure 1:
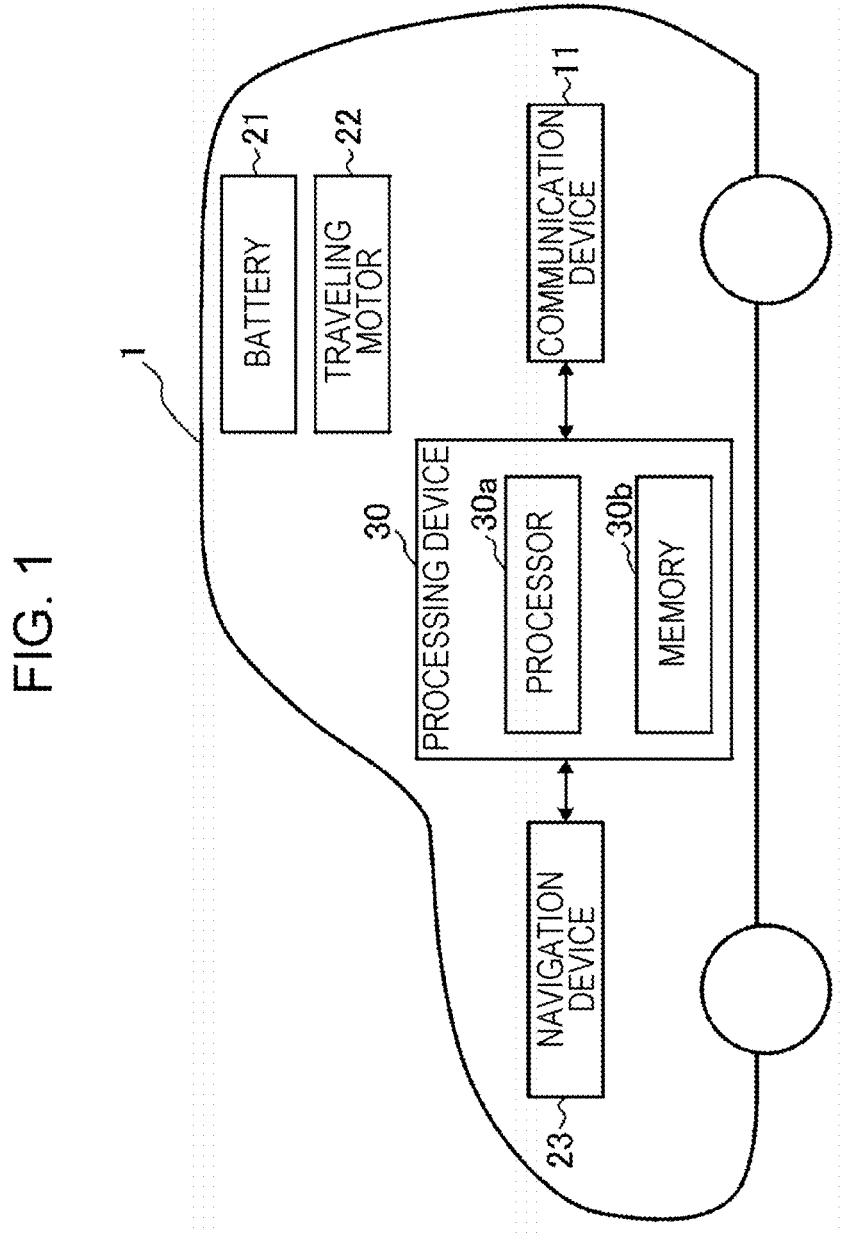
FIG. 1 is a schematic diagram illustrating a schematic configuration of a vehicle according to an embodiment of the present disclosure.

In order to assist driving of a driver who drives the vehicle, various techniques for predicting the consumption amount of the energy source of the vehicle have been proposed. However, it is desired to propose more techniques for more accurately predicting the consumption amount of the energy source of the vehicle.

Thus, it is desired to provide a processing device capable of accurately predicting the consumption amount of the energy source of the vehicle.

Hereinafter, an embodiment of the present disclosure will be described in detail with reference to the accompanying drawings. Specific dimensions, materials, numerical values, and the like illustrated in the embodiment are merely examples for facilitating understanding of the disclosure, and do not limit the present disclosure unless otherwise specified. In this specification and the drawings, elements having substantially the same functions and configurations are denoted by the same reference numerals to omit redundant description, and elements not directly related to the present disclosure are not illustrated.

Configuration of Vehicle

A configuration of a vehicle 1 according to the embodiment of the present disclosure will be described with reference to FIGS. 1 and 2.

FIG. 1 is a schematic diagram illustrating a schematic configuration of the vehicle 1. Hereinafter, an example will be described in which the vehicle 1 is an electric vehicle including a battery 21 and travels using electric power stored in the battery 21 as an energy source. That is, in the following example, a travel distance per unit capacity of the energy source is an electric power consumption rate.

However, the energy source of the vehicle 1 is not limited to the electric power stored in the battery 21. For example, the vehicle 1 may be an engine vehicle including an engine, and may travel using fuel supplied to the engine as an energy source. In this case, the travel distance per unit capacity of the energy source is fuel economy.

As illustrated in FIG. 1, the vehicle 1 includes a communication device 11, the battery 21, a traveling motor 22, a navigation device 23, and a processing device 30.

The communication device 11 communicates with an external device of the vehicle 1.

The battery 21 can charge and discharge electric power. As the battery 21, for example, a lithium ion battery, a lithium ion polymer battery, a nickel-metal hydride battery, a nickel-cadmium battery, or a lead storage battery is used, but a battery other than these may be used. The battery 21 stores electric power to be supplied to the traveling motor 22.

The traveling motor 22 outputs power to be transmitted to the wheels of the vehicle 1, and is constituted by, for example, a three phase AC motor. The traveling motor 22 is driven by the electric power of the battery 21 to output the power. The traveling motor 22 is also regeneratively driven during deceleration of the vehicle 1 and can generate electric power by using kinetic energy of the wheels. In this case, the electric power generated by the traveling motor 22 is supplied to the battery 21. Thus, the battery 21 is charged with the electric power generated by the traveling motor 22.

The navigation device 23 is a device that provides guidance of a traveling route from a current location of the vehicle 1 to a destination desired by a user in response to an input operation performed by the driver of the vehicle 1. The navigation device 23 determines a recommended traveling route from among candidate traveling routes and proposes the determined recommended traveling route to the user. In this specification, the recommended traveling route is a traveling route in which consumption of the energy source is suppressed. The driver refers to the recommended traveling route and selects a traveling route as a guidance target of the navigation device 23 from among the candidate traveling routes.

For example, the navigation device 23 has a function of visually displaying information, and displays various kinds of information related to route guidance. The information displayed by the navigation device 23 includes, for example, the current location of the vehicle 1, the traveling route as the guidance target, the position of the destination, the distance from the current location of the vehicle 1 to the destination on the traveling route, the time to arrive at the destination, and the like. Based on signals transmitted from global positioning system (GPS) satellites, the navigation device 23 can acquire information indicating the current location of the vehicle 1.

The processing device 30 includes one or more processors 30*a* and one or more memories 30*b* coupled to the one or more processors 30*a*. The one or more processors 30*a* include, for example, a central processing unit (CPU). The one or more memories 30*b* include, for example, a read only memory (ROM), a random access memory (RAM), and the like. The ROM is a storage element that stores programs, operation parameters, and the like used by the CPU. The RAM is a storage element that temporarily stores data such as variables and parameters used for processing performed by the CPU.

The processing device 30 communicates with the devices in the vehicle 1 such as the communication device 11 and the navigation device 23. Communication between the processing device 30 and the devices is performed by using, for example, controller area network (CAN) communication.

Figures 2, 3:
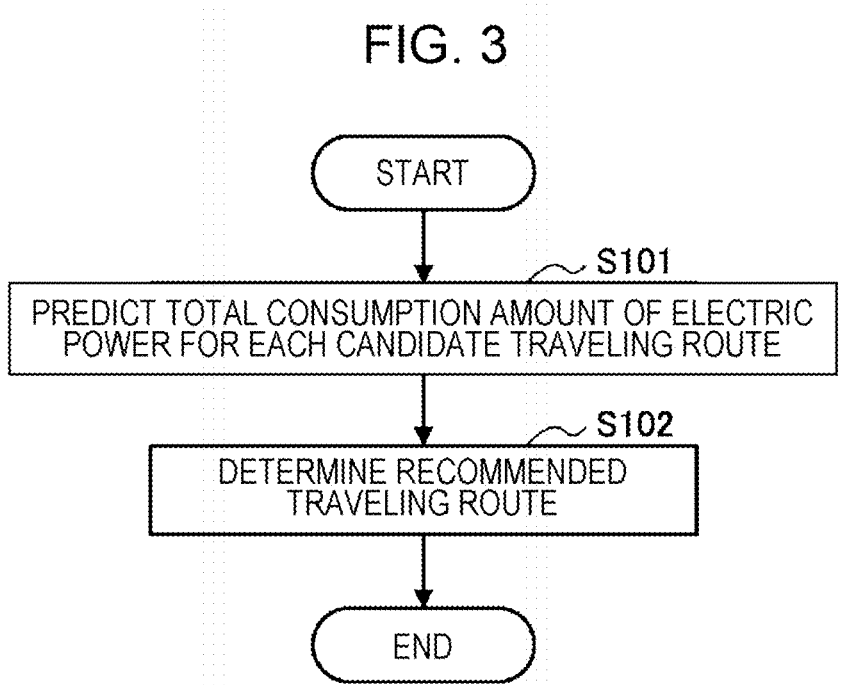
FIG. 2 is a block diagram illustrating an example of a functional configuration of a processing device according to the embodiment of the present disclosure.
FIG. 3 is a flowchart illustrating a first example of a flow of processing performed by the processing device according to the embodiment of the present disclosure.

FIG. 2 is a block diagram illustrating an example of a functional configuration of the processing device 30. For example, as illustrated in FIG. 2, the processing device 30 includes an acquiring unit 31 and a processing unit 32. Note that various kinds of processing including the processing described below performed by the acquiring unit 31 or the processing unit 32 may be performed by the one or more processors 30*a*. In more detail, the one or more processors 30*a* perform a program stored in the one or more memories 30*b* to perform various kinds of processing.

The acquiring unit 31 acquires various kinds of information and outputs the information to the processing unit 32. For example, the acquiring unit 31 acquires the information from the communication device 11 and the navigation device 23. In this specification, the acquisition of the information may include extraction or generation (for example, calculation) of the information.

The processing unit 32 performs various kinds of processing using the various kinds of information acquired by the acquiring unit 31. The processing unit 32 also has a function of controlling the operation of the navigation device 23.

Note that the functions of the processing device 30 according to the present embodiment may be divided by devices, and the functions may be implemented by a single device. In a case where the functions of the processing device 30 are divided by devices, the devices may be coupled to each other via a communication bus such as a CAN.

Operation of Processing Device

Next, the operation of the processing device 30 according to the embodiment of the present disclosure will be described with reference to FIGS. 3 to 5.

In the present embodiment, the processing device 30 acquires pattern information, which is information indicating an operation pattern of a traffic light that is present on the traveling route of the vehicle 1, and predicts, based on the pattern information, the total consumption amount of the energy source of the vehicle 1 in a case where the vehicle 1 travels on the traveling route. Accordingly, as will be described later, the consumption amount of the energy source of the vehicle 1 can be accurately predicted. In the following example, the energy source is electric power.

The operation pattern of the traffic light indicated by the pattern information is, for example, a pattern indicating the next color of the traffic light and its change timing. Examples of the pattern information include information in which information indicating the colors of the traffic light at respective times are arranged in time series, information indicating a cycle of changing the color of the traffic light, and the like. Hereinafter, an example will be described in which the processing device 30 acquires the pattern information indicating the operation patterns of traffic lights that are present on the traveling route of the vehicle 1. However, the processing device 30 may acquire the pattern information indicating the operation pattern of at least one traffic light that is present on the traveling route of the vehicle 1.

Hereinafter, a first example and a second example will be described in order as examples of processing performed by the processing device 30.

FIG. 3 is a flowchart illustrating the first example of a flow of processing performed by the processing device 30. The control flow illustrated in FIG. 3 is repeatedly executed, for example, at preset time intervals.

Upon starting of the control flow illustrated in FIG. 3, first, in step S101, the processing device 30 predicts the total consumption amount of electric power for each candidate traveling route. For example, the processing device 30 predicts the total consumption amount of electric power of the battery 21 in a case where the vehicle 1 travels on each candidate traveling route. The candidate traveling routes are extracted by the navigation device 23, for example, based on the current location of the vehicle 1 and the destination desired by the user. Details of the processing in step S101 will be described later with reference to FIG. 4.

In step S102 after step S101, the processing unit 32 of the processing device 30 determines the recommended traveling route, and the control flow illustrated in FIG. 3 ends. As described above, the recommended traveling route is a traveling route in which consumption of electric power is suppressed. That is, in step S101, the processing unit 32 determines the candidate traveling route having the smallest predicted total consumption amount of electric power as the recommended traveling route. The processing unit 32 then notifies the driver of the recommended traveling route, for example, by causing the navigation device 23 to display the recommended traveling route.

Figure 4:
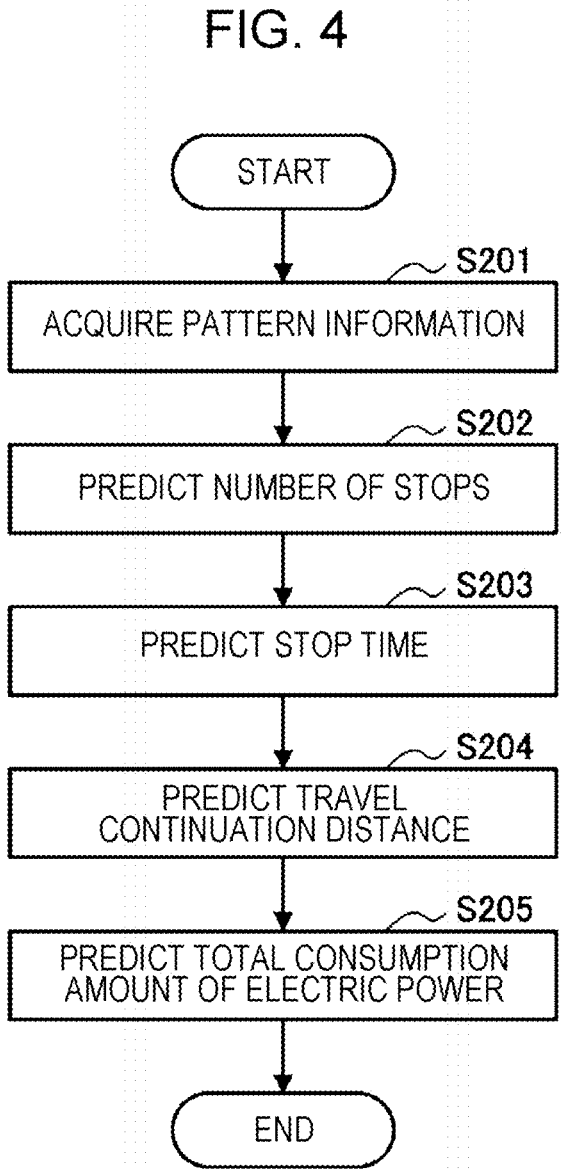
FIG. 4 is a flowchart illustrating an example of a flow of processing in which the processing device according to the embodiment of the present disclosure predicts a total consumption amount of electric power.

FIG. 4 is a flowchart illustrating an example of a flow of processing in which the processing device 30 predicts the total consumption amount of electric power. The control flow illustrated in FIG. 4 is executed in step S101 in FIG. 3.

For example, the control flow illustrated in FIG. 4 is a control flow for predicting the total consumption amount of electric power for one traveling route. Therefore, in step S101 in FIG. 3, the control flow illustrated in FIG. 4 is sequentially performed for all the candidate traveling routes.

Figure 5:
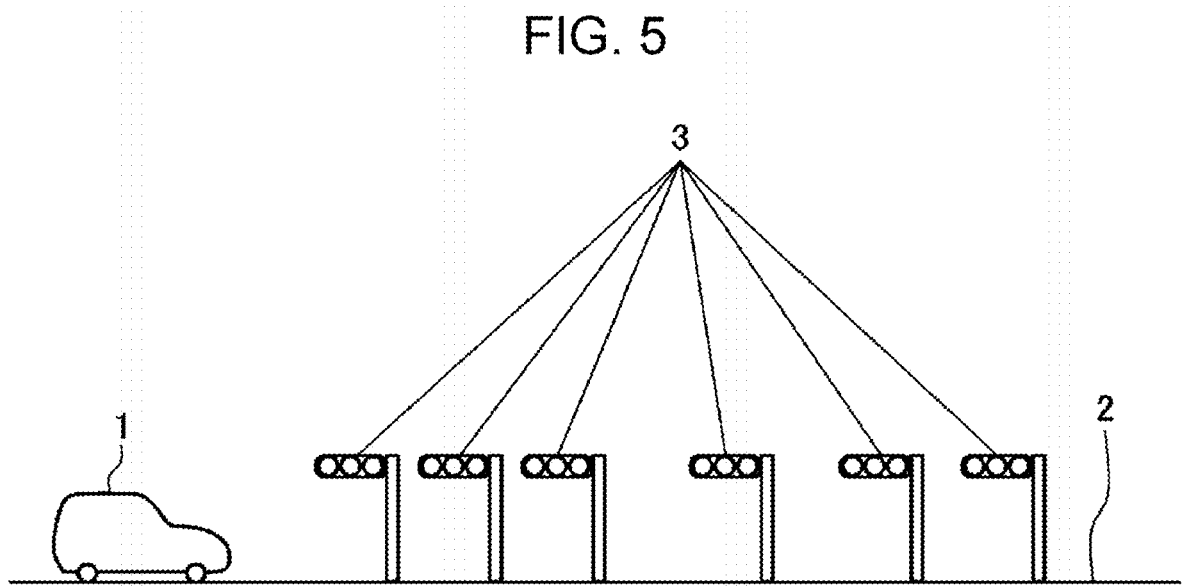
FIG. 5 is a diagram schematically illustrating a traveling route of the vehicle according to the embodiment of the present disclosure.

FIG. 5 is a diagram schematically illustrating a traveling route 2 of the vehicle 1. For example, in a case where the traveling route 2 illustrated in FIG. 5 is extracted as the candidate traveling route, the total consumption amount of electric power of the battery 21 in a case where the vehicle 1 travels on the traveling route 2 is predicted in the control flow illustrated in FIG. 4. As illustrated in FIG. 5, traffic lights 3 are present on the traveling route 2. The type of the traffic lights 3 includes a centralized control type and a decentralized control type. The centralized control type is a type installed in a specific area with a relatively large traffic volume and controlled by a computer at a traffic control center. The decentralized control type is a type installed in a place with a relatively small traffic volume, not coupled to the computer at the traffic control center, and controlled independently.

Upon starting of the control flow illustrated in FIG. 4, first, in step S201, the acquiring unit 31 acquires the pattern information indicating the operation patterns of the traffic lights 3 that are present on the traveling route 2.

In step S201, the acquiring unit 31 acquires the pattern information by, for example, a method that differs depending on the type of the traffic lights 3. Information indicating the number, positions, and type of the traffic lights 3 on the traveling route 2 is stored in, for example, the navigation device 23 in advance. For example, the acquiring unit 31 acquires these pieces of information from the navigation device 23 when the candidate traveling route is extracted.

In a case where the traffic lights 3 for which the pattern information is to be acquired are of the centralized control type, for example, the acquiring unit 31 acquires the pattern information of the traffic lights 3 of the centralized control type from the computer at the traffic control center. In this case, the acquiring unit 31 communicates with the computer at the traffic control center via the communication device 11.

In addition, in a case where the traffic lights 3 for which the pattern information is to be acquired are of the decentralized control type, for example, the acquiring unit 31 acquires the pattern information of the traffic lights 3 of the decentralized control type from the navigation device 23. In this case, the pattern information of the traffic lights 3 of the decentralized control type is stored in the navigation device 23 in advance.

In step S202 after step S201, based on the pattern information, the processing unit 32 predicts the number of stops, which is the number of times the vehicle 1 stops at the traffic lights 3.

In step S202, the processing unit 32 performs, for example, a simulation assuming that the traffic lights 3 that are present on the traveling route 2 operate in the operation patterns indicated by the pattern information and the vehicle 1 travels while accelerating to a legal speed limit. This simulation is performed based on the number, positions, and pattern information of the traffic lights 3 that are present on the traveling route 2, and the legal speed limit of the traveling route 2. In this simulation, the vehicle 1 stops at one or more red traffic lights among the traffic lights 3 and travels without stopping except at the one or more red traffic lights. In this simulation, the vehicle 1 accelerates in a case where the vehicle speed is lower than the legal speed limit, and maintains the vehicle speed in a case where the vehicle speed reaches the legal speed limit. In this simulation, the vehicle 1 accelerates at a preset acceleration. The acceleration is set by, for example, an average value of the acceleration of the past record of the vehicle 1. In this simulation, the vehicle 1 decelerates at a preset speed change rate before a red traffic light so that the vehicle 1 can stop at the red traffic light. The speed change rate is set by, for example, an average value of the speed change rates at the time of deceleration in the past record of the vehicle 1.

Based on the results of the simulation, the processing unit 32 can predict the behavior of the vehicle 1 in a case where the vehicle 1 travels on the traveling route 2. In step S202, based on the results of the simulation, the processing unit 32 predicts the number of stops. For example, in the above-described simulation, the processing unit 32 can specify the speeds of the vehicle 1 at the respective time points, and thus can specify the positions of the vehicle 1 at the respective time points. The processing unit 32 can also specify the colors of the traffic lights 3 at the respective time points. Therefore, the processing unit 32 can specify the color of each of the traffic lights 3 in a case where the vehicle 1 reaches the installation position of the traffic light 3. Therefore, the processing unit 32 can specify a traffic light 3 or traffic lights 3 at which the vehicle 1 will stop. For example, in this way, the processing unit 32 can predict the number of stops. In more detail, the processing unit 32 can also predict the traffic light 3 or traffic lights 3 at which the vehicle 1 will stop.

In step S203 after step S202, based on the pattern information, the processing unit 32 predicts a stop time, which is a time during which the vehicle 1 is stopped at one of the traffic lights 3. In a case where the vehicle 1 is predicted to stop at some of the traffic lights 3, the processing unit 32 predicts the stop time for each of the traffic lights 3.

In step S203, for example, based on the results of the above-described simulation, the processing unit 32 predicts the stop time. For example, in the above-described simulation, the processing unit 32 can specify the speeds of the vehicle 1 at the respective time points, and thus can specify the positions of the vehicle 1 at the respective time points. The processing unit 32 can also specify the colors of the traffic lights 3 at the respective time points. Therefore, in a case where the vehicle 1 reaches and stops at a red traffic light among the traffic lights 3, the processing unit 32 can specify the time from the timing at which the vehicle 1 stops to the timing at which the color of the traffic light 3 changes from red to green and the vehicle 1 starts. For example, in this way, the processing unit 32 can predict the stop time. In more detail, the processing unit 32 can also predict the traffic light 3 at which the vehicle 1 will stop and how long the vehicle 1 will be stopped.

In step S204 after step S203, based on the pattern information, the processing unit 32 predicts a travel continuation distance, by which the vehicle 1 continuously travels after the vehicle 1 stops at one of the traffic lights 3 until the vehicle 1 stops at another one of the traffic lights 3 next time. In a case where the vehicle 1 is predicted to stop at some of the traffic lights 3, the distance between one of the traffic lights 3 and another one of the traffic lights 3, which is disposed consecutively (for example, the distance along the road) corresponds to the travel continuation distance.

In step S204, for example, based on the results of the above-described simulation, the processing unit 32 predicts the travel continuation distance.

In step S205 after step S204, the processing unit 32 predicts the total consumption amount of electric power of the battery 21 in a case where the vehicle 1 travels on the traveling route 2, and the control flow illustrated in FIG. 4 ends.

In step S205, for example, based on the number of stops, the processing unit 32 predicts the total consumption amount of electric power. Here, if the vehicle 1 stops at a traffic light 3, the vehicle 1 is to be additionally accelerated after the stop. Therefore, if the vehicle 1 stops at the traffic light 3, an energy loss occurs due to the additional acceleration and deceleration of the vehicle 1, compared to a case where the vehicle 1 passes through the traffic light 3 without stopping. In this way, electric power is consumed due to the stop of the vehicle 1 at the traffic light 3. As the total consumption amount of electric power, the processing unit 32 can predict a value obtained by multiplying the number of stops by the consumption amount of electric power due to one stop of the vehicle 1 at the traffic light 3.

For example, the consumption amount of electric power due to one stop of the vehicle 1 at the traffic light 3 is stored in a storage element of the processing device 30 in advance. The processing unit 32 multiplies the number of stops by the consumption amount of electric power due to one stop of the vehicle 1 at the traffic light 3. The processing unit 32 further adds the value obtained in this way to the total consumption amount of electric power expected in a case where the vehicle 1 travels on the traveling route 2 without stopping at the traffic lights 3. The processing unit 32 then predicts the finally obtained value as the total consumption amount of electric power of the battery 21 in a case where the vehicle 1 travels on the traveling route 2.

The consumption amount of electric power due to one stop of the vehicle 1 at the traffic light 3 is obtained, for example, by subtracting a regeneration amount of electric power obtained due to the stop of the vehicle 1 at the traffic light 3 from the consumption amount of electric power due to acceleration of the vehicle 1 after the stop. The consumption amount of electric power due to acceleration of the vehicle 1 after the stop is obtained based on, for example, a target vehicle speed at the time of constant speed traveling, the weight of the vehicle 1, a power transmission efficiency in the vehicle 1, and the like. The regeneration amount of electric power obtained due to the stop of the vehicle 1 at the traffic light 3 is obtained based on, for example, the target vehicle speed at the time of constant speed traveling, the weight of the vehicle 1, a regeneration efficiency in the vehicle 1, and the like. The target vehicle speed at the time of constant speed traveling is, for example, the legal speed limit in the above-described simulation.

Here, in order to more accurately predict the total consumption amount of electric power of the vehicle 1 in a case where the vehicle 1 travels on the traveling route 2, the processing unit 32 may predict the total consumption amount of electric power, based on other information in addition to the number of stops.

For example, the processing unit 32 may predict the total consumption amount of electric power, based on the stop time in addition to the number of stops. Here, even when the vehicle 1 is stopped, electric power is consumed due to driving of various auxiliary machines such as an air conditioner and an acoustic device in the vehicle 1. Therefore, as the stop time at the traffic light 3 increases, the consumption amount of electric power increases. Therefore, for example, as the stop time increases, the processing unit 32 predicts a larger value as the total consumption amount of electric power in a case where the vehicle 1 travels on the traveling route 2.

In addition, for example, the processing unit 32 may predict the total consumption amount of electric power, based on the travel continuation distance in addition to the number of stops. Here, in a case where the travel continuation distance is short, a situation may occur in which the vehicle 1 is not capable of accelerating to the target vehicle speed after the vehicle 1 stops at one of the traffic lights 3 until the vehicle 1 stops at another one of the traffic lights 3 next time. Note that the target vehicle speed is, for example, the legal speed limit in the above-described simulation. As a result, for example, the consumption amount of electric power increases due to a decrease in the time for which constant speed traveling is possible. Therefore, for example, as the travel continuation distance decreases, the processing unit 32 predicts a larger consumption amount of electric power for the section corresponding to the travel continuation distance. In addition, the processing unit 32 predicts a larger value as the total consumption amount of electric power in a case where the vehicle 1 travels on the traveling route 2.

Note that the processing unit 32 may predict the total consumption amount of electric power, based on both the stop time and the travel continuation distance in addition to the number of stops, or may predict the total consumption amount of electric power, based on one of the stop time and the travel continuation distance in addition to the number of stops.

As described above, in the first example, the processing device 30 acquires the pattern information, which is the information indicating the operation patterns of the traffic lights 3 that are present on the traveling route 2 of the vehicle 1, and predicts, based on the pattern information, the total consumption amount of the energy source of the vehicle 1 in a case where the vehicle 1 travels on the traveling route 2. Accordingly, the total consumption amount can be predicted in consideration of the operation patterns of the traffic lights 3, and thus, the consumption amount of the energy source of the vehicle 1 can be accurately predicted. For example, in the first example, based on the total consumption amount, the processing device 30 determines the recommended traveling route in which consumption of the energy source is suppressed. Accordingly, the recommended traveling route can be appropriately determined. In the above example, the energy source is electric power.

Figure 6:
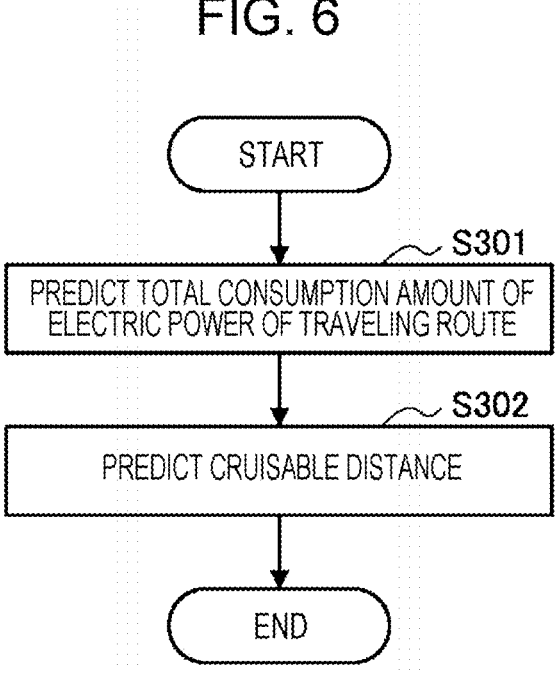
FIG. 6 is a flowchart illustrating a second example of the flow of processing performed by the processing device according to the embodiment of the present disclosure.

FIG. 6 is a flowchart illustrating the second example of the flow of processing performed by the processing device 30. The control flow illustrated in FIG. 6 is repeatedly executed, for example, at preset time intervals.

Upon starting of the control flow illustrated in FIG. 6, first, in step S301, the processing device 30 predicts the total consumption amount of electric power of the battery 21 in a case where the vehicle 1 travels on the traveling route 2. The traveling route 2 in the second example in FIG. 6 is, for example, a route selected by the driver as the guidance target of the navigation device 23.

In step S301, the control flow in FIG. 4 described above is executed.

In step S302 after step S301, the processing unit 32 of the processing device 30 predicts a cruisable distance of the vehicle 1, and the control flow illustrated in FIG. 6 ends.

In step S302, for example, based on a remaining capacity of the battery 21 and the total consumption amount of electric power predicted in step S301, the processing unit 32 predicts the cruisable distance of the vehicle 1. For example, the processing unit 32 subtracts the total consumption amount of electric power predicted in step S301 from the remaining capacity of the battery 21. Then, the processing unit 32 multiplies the value obtained in this way by the electric power consumption rate of the vehicle 1, and predicts a travelable distance of the vehicle 1 that has finished traveling on the traveling route 2. The processing unit 32 further predicts, as the cruisable distance, the sum of the travelable distance of the vehicle 1 that has finished traveling on the traveling route 2 and the travel distance on the traveling route 2. Then, for example, the processing unit 32 notifies the driver of the cruisable distance by causing the navigation device 23 to display the cruisable distance.

As described above, in the second example, as in the above-described first example, the processing device 30 acquires the pattern information, which is the information indicating the operation patterns of the traffic lights 3 that are present on the traveling route 2 of the vehicle 1, and predicts, based on the pattern information, the total consumption amount of the energy source of the vehicle 1 in a case where the vehicle 1 travels on the traveling route 2. Accordingly, the total consumption amount can be predicted in consideration of the operation patterns of the traffic lights 3, and thus, the consumption amount of the energy source of the vehicle 1 can be accurately predicted. For example, in the second example, based on the total consumption amount, the processing device 30 predicts the cruisable distance of the vehicle 1. Accordingly, the cruisable distance of the vehicle 1 can be accurately predicted. In the above example, the energy source is electric power.

The first example and the second example have been described above as examples of processing performed by the processing device 30 with reference to the flowchart in FIG. 3, the flowchart in FIG. 4, and the flowchart in FIG. 6. However, the processing performed by the processing device 30 is not limited to the above examples.

For example, the above first example and the second example have described the examples in which the processing unit 32 predicts the total consumption amount of electric power in a case where the vehicle 1 travels on the traveling route 2, based on the number of stops. However, the processing unit 32 may predict the total consumption amount of electric power without specifying the value corresponding to the number of stops. For example, the processing unit 32 may predict the total consumption amount of electric power by calculating the fluctuation of the electric power of the battery 21 in the above-described simulation.

In addition, for example, the processing device 30 may determine the recommended traveling route, based on the total consumption amount of the energy source in a case where the vehicle 1 travels on the traveling route as in the first example, and may predict the cruisable distance of the vehicle 1, based on the total consumption amount as in the second example.

In addition, for example, in a case where the processing device 30 acquires information on an accident, traffic control, road closure, or the like on the traveling route 2 from the computer at the traffic control center, the processing device 30 may output such information to the navigation device 23, and the navigation device 23 may extract the candidate traveling routes, based on the information.

Effects of Processing Device

Next, effects of the processing device 30 according to the embodiment of the present disclosure will be described.

The one or more processors 30*a* of the processing device 30 according to the present embodiment perform a process including: acquiring the pattern information, which is information indicating the operation pattern of the at least one traffic light 3 that is present on the traveling route 2 of the vehicle 1; and predicting, based on the pattern information, the total consumption amount of the energy source of the vehicle 1 in a case where the vehicle 1 travels on the traveling route 2. Accordingly, the total consumption amount can be predicted in consideration of the operation pattern of the at least one traffic light 3, and thus, the consumption amount of the energy source of the vehicle 1 can be accurately predicted. In the above examples, the energy source is electric power.

In addition, the one or more processors 30*a* of the processing device 30 according to the present embodiment may perform a process including determining, based on the total consumption amount, the recommended traveling route in which consumption of the energy source is suppressed. Accordingly, the recommended traveling route can be determined by predicting the total consumption amount in consideration of the operation pattern of the at least one traffic light 3, and thus, the recommended traveling route can be appropriately determined.

In addition, the one or more processors 30*a* of the processing device 30 according to the present embodiment may perform a process including predicting, based on the total consumption amount, the cruisable distance of the vehicle 1. Accordingly, the cruisable distance of the vehicle 1 can be predicted by predicting the total consumption amount in consideration of the operation pattern of the at least one traffic light 3, and thus, the cruisable distance of the vehicle 1 can be accurately predicted.

In addition, the one or more processors 30*a* of the processing device 30 according to the present embodiment may perform a process including: predicting, based on the pattern information, the number of stops, which is the number of times the vehicle 1 stops at the at least one traffic light 3; and predicting, based on the number of stops, the total consumption amount. Accordingly, the total consumption amount of the energy source of the vehicle 1 in a case where the vehicle 1 travels on the traveling route 2 can be accurately and appropriately predicted.

In addition, the one or more processors 30*a* of the processing device 30 according to the present embodiment may perform a process including: predicting, based on the pattern information, the stop time, which is the time during which the vehicle 1 is stopped at the at least one traffic light 3; and predicting, based on the stop time in addition to the number of stops, the total consumption amount. Accordingly, the total consumption amount of the energy source of the vehicle 1 in a case where the vehicle 1 travels on the traveling route 2 can be more accurately predicted.

In addition, the at least one traffic light 3 may include traffic lights 3, the pattern information may indicate operation patterns of the traffic lights 3, and the one or more processors 30*a* of the processing device 30 according to the present embodiment may perform a process including: predicting, based on the pattern information, the travel continuation distance by which the vehicle 1 continuously travels after the vehicle 1 stops at one of the traffic lights 3 until the vehicle 1 stops at another one of the traffic lights 3 next time; and predicting, based on the travel continuation distance in addition to the number of stops, the total consumption amount. Accordingly, the total consumption amount of the energy source of the vehicle 1 in a case where the vehicle 1 travels on the traveling route 2 can be more accurately predicted.

While the embodiment of the present disclosure has been described with reference to the appended drawings, it is to be understood that the present disclosure is not limited to the above embodiment. It is to be understood that various changes and modifications within the scope of the appended claims fall within the technical scope of the present disclosure.

For example, the processing described with reference to the flowcharts in this specification may not necessarily be performed in the order illustrated in the flowcharts. Also, additional processing steps may be employed, and some processing steps may be skipped.

According to the present disclosure, the consumption amount of the energy source of the vehicle can be accurately predicted.

The processing device 30 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the processing device 30 including the acquiring unit 31 and the processing unit 32. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A processing device comprising:
one or more processors; and
one or more memories coupled to the one or more processors, wherein
the one or more processors are configured to perform a process comprising:
acquiring pattern information, which is information indicating an operation pattern of one or more traffic lights that is present on a traveling route of a vehicle, the pattern information including at least one of time-series information of signal color at respective times or a cycle of color change;
executing, based on the pattern information, positions of traffic lights on the traveling route, and a legal speed for the route, a time-series simulation that assumes predetermined acceleration and deceleration, and
predicting, based on results of the simulation, (i) a number of stops at the one or more traffic lights and a stop time at each traffic light, and (ii) a travel continuation distance by which the vehicle continuously travels after stopping at one traffic light until a next stop at another traffic light;
predicting, based on at least the predicted number of stops, the predicted stop times, and the predicted travel continuation distance, a total consumption amount of an energy source of the vehicle for travel on the traveling route, the predicting comprising at least (i) determining, for each stop, an energy consumption amount for re-acceleration after the stop, (ii) subtracting a regenerative energy amount obtained during deceleration to the stop from the energy consumption amount for re-acceleration, (iii) accounting for auxiliary-load energy consumption during the predicted stop times, and (iv) accounting for additional energy-consumption effects in sections where the travel continuation distance is short such that a target vehicle speed corresponding to the legal speed cannot be reached; and
based on the predicted total consumption amount and a remaining capacity of the energy source, determining a recommended traveling route that suppresses consumption of the energy source, or predicting a cruisable distance of the vehicle.

2. The processing device according to claim 1,
wherein the one or more processors are further configured to predict, based on the pattern information, a stop time that is a time during which the vehicle is stopped at the one or more traffic lights, and
wherein predicting the predicted total consumption amount comprises accounting for the predicted stop times in addition to the predicted number of stops and the predicted travel continuation distance.

3. The processing device according to claim 1,
wherein the one or more traffic lights comprises traffic lights, and the pattern information indicates respective operation patterns of the traffic lights, and
wherein the one or more processors are further configured to predict, based on the pattern information, a travel continuation distance by which the vehicle continuously travels after stopping at one of the traffic lights until a next stop at another of the traffic lights; and
wherein predicting the predicted total consumption amount comprises accounting for the predicted travel continuation distance in addition to the predicted number of stops and the predicted stop times.

4. The processing device according to claim 1,
wherein the vehicle comprises, as the energy source, a battery configured to store electric power to be supplied to a traveling motor, and
wherein predicting the predicted total consumption amount comprises using the predicted number of stops and, for each stop at the one or more traffic lights, a per-stop electric-power consumption amount obtained by subtracting a regenerative electric-power amount recovered during deceleration to the stop from an electric-power consumption amount for re-acceleration after the stop.

* * * * *